US008474435B2

(12) United States Patent
Lemke

(10) Patent No.: US 8,474,435 B2
(45) Date of Patent: Jul. 2, 2013

(54) OPPOSED PISTON, COMPRESSION IGNITION ENGINE WITH SINGLE-SIDE MOUNTED CRANKSHAFTS AND CROSSHEADS

(75) Inventor: James U. Lemke, La Jolla, CA (US)

(73) Assignee: Achates Power, Inc., San Diego, CA (US)

( * ) Notice: Subject to any disclaimer, the term of this patent is extended or adjusted under 35 U.S.C. 154(b) by 975 days.

(21) Appl. No.: 12/584,106

(22) Filed: Aug. 31, 2009

(65) Prior Publication Data

US 2010/0071671 A1 Mar. 25, 2010

Related U.S. Application Data

(60) Provisional application No. 61/191,070, filed on Sep. 4, 2008.

(51) Int. Cl.

| | |
|---|---|
| ***F16C 9/00*** | (2006.01) |
| ***F02B 75/20*** | (2006.01) |
| ***F02B 75/22*** | (2006.01) |
| ***F02B 75/24*** | (2006.01) |

(52) U.S. Cl.
USPC ........ 123/350; 123/53.1; 123/53.3; 123/53.5; 123/55.1; 123/55.2; 123/55.5; 123/55.7; 123/59.6; 123/197.4

(58) Field of Classification Search
USPC .................... 123/53.1, 53.3, 53.5, 55.1, 55.2, 123/55.5, 55.7, 59.6, 197.4
See application file for complete search history.

(56) References Cited

U.S. PATENT DOCUMENTS

| | | | | | |
|---|---|---|---|---|---|
| 1,595,785 | A * | 8/1926 | Jackson | 74/604 |
| 2,165,211 | A * | 7/1939 | Bass et al. | 362/228 |
| 2,357,031 | A * | 8/1944 | Stabler | 123/51 BB |
| 2,359,564 | A * | 10/1944 | Kilchenmann | 123/51 BA |
| 2,398,980 | A * | 4/1946 | Vonruti | 123/51 B |
| 2,840,060 | A * | 6/1958 | Johansson | 123/41 R |
| 3,520,285 | A * | 7/1970 | Klauder, Jr. | 123/53.2 |
| 3,808,897 | A * | 5/1974 | Ohma | 74/44 |
| 4,255,929 | A * | 3/1981 | Frosch et al. | 60/517 |
| 4,287,863 | A * | 9/1981 | Rauen | 123/432 |

(Continued)

OTHER PUBLICATIONS

Yashlay Sinha, Cross-head assembly for a horizontal engine, Wayback machine dates to May 24, 2006, Autodesk, Inc., see Website at http://students.autodesk.com/?nd=showcase_detail_page&gallery_id=8919&jid=191413.*

(Continued)

*Primary Examiner* — Lindsay Low
*Assistant Examiner* — Charles Brauch
(74) *Attorney, Agent, or Firm* — Terrance A. Meador; Incaplaw

(57) ABSTRACT

In an opposed piston, compression ignition engine two crankshafts are single-side mounted with respect to a row of cylinders, which is to say that the crankshafts are mounted so that their axes of rotation lie in a plane that is spaced apart from and parallel to a plane in which the axes of the cylinders lie. Each piston of the engine is coupled to one of the crankshafts by a single linkage guided by a crosshead. The piston has a piston rod affixed at one end to the piston. The other end of the piston rod is affixed to the crosshead pin. One end of a connecting rod swings on the pin and the other end is coupled to a throw on a crankshaft. Each crosshead is constrained to reciprocate between fixed guides, in alignment with the piston rod to which it is coupled.

15 Claims, 14 Drawing Sheets

U.S. PATENT DOCUMENTS

| | | | | |
|---|---|---|---|---|
| 4,466,388 | A * | 8/1984 | Tryhorn | 123/51 BB |
| 4,614,169 | A * | 9/1986 | Figliuzzi | 123/53.2 |
| 5,595,147 | A * | 1/1997 | Feuling | 123/52.4 |
| 5,778,834 | A * | 7/1998 | Piccinini | 123/55.2 |
| 7,240,647 | B2 * | 7/2007 | Betzmeir | 123/53.2 |
| 7,434,562 | B2 * | 10/2008 | Ishimitsu | 123/197.4 |
| 7,584,725 | B2 * | 9/2009 | Ishimitsu | 123/50 R |
| 8,087,389 | B2 * | 1/2012 | Lemke et al. | 123/41.35 |
| 2008/0223031 | A1 * | 9/2008 | Sollie et al. | 60/517 |

OTHER PUBLICATIONS

Wikipedia, Crosshead, http://en.wikipedia.org/wiki/crosshead.*

* cited by examiner

OPPOSED PISTON, COMPRESSION IGNITION ENGINE WITH SINGLE-SIDE MOUNTED CRANKSHAFTS AND CROSSHEADS

PRIORITY

This Application claims priority under U.S. Provisional Application for Patent 61/191,070, filed Sep. 4, 2008.

RELATED APPLICATIONS

This application contains subject matter related to the subject matter of identically-titled U.S. patent application Ser. No. 12/584,086, filed Aug. 31, 2009.

BACKGROUND

This specification relates to an internal combustion engine in which cylinders contain pairs of opposed pistons. More specifically the specification concerns an opposed piston, compression ignition engine with two crankshafts in which the crankshafts have axes of rotation lying in a plane that is spaced apart from and parallel to a plane in which the axes of the cylinders lie. Each piston includes a piston rod coupled to one end of a connecting rod by a crosshead external to the piston. The other end of the connecting rod is coupled to a crank throw. The crosshead is constrained to maintain alignment with the piston rod by moving between fixed guides.

The classical opposed piston engine invented by Hugo Junkers includes two crankshafts, each disposed near a respective end of a rank of cylinders. The crankshafts are linked by connecting rods to respective pistons. Wristpins within the pistons couple the connecting rods to the pistons. In such an engine, the crankshafts operate with unequal torques, which produces substantial vibration in the long gear train coupling the crankshafts to the output drive.

An alternate opposed piston engine construction mounts the crankshafts beside the cylinders such that their axes of rotation lie in a plane that bisects the cylinders and is normal to the axes of the cylinders. Examples of this construction are found in U.S. Pat. No. 7,156,056 and US publication 2006/0157003, both commonly owned herewith. Such side-mounted crankshafts are closer together than those in the Junkers opposed piston engine. The crankshafts operate with equal torques and are coupled to an output drive by a shorter gear train than that of the Junkers engine. Each piston is coupled to both crankshafts by a mechanism including a piston rod coupled by an external pin to a pair of linkages. Each of the linkages is coupled to a respective one of the crankshafts. For each piston, one linkage includes a single connecting rod coupled to one crankshaft between two connecting rods of its opposed piston, and the other linkage includes two connecting rods coupled to the other crankshaft on either side of a single connecting rod of its opposed piston. Thus, each piston has three connecting rods. Since each piston is coupled to both crankshafts, the opposing lateral forces caused by the reciprocal motions of the two linkages cancel, thus avoiding side forces on the piston.

In this alternate construction the clearance between the sides of the cylinders and the side-mounted crankshafts with multiple connecting rods coupled thereto is low, which limits the space available for placement of fuel injectors and intake and exhaust manifolds on the cylinders. Moreover, since each piston has three connecting rods, the total number of connecting rods for all pistons adds substantially to the weight of the engine. Further, each crankshaft must be coupled to every pair of opposed pistons by three connecting rods, and the extra throws required for all of the connecting rods add weight and length to the crankshafts.

I have found that certain modifications of the alternative construction may reduce or eliminate these drawbacks and also yield other benefits. For example, location of both crankshafts on one side of the cylinders would free up space on the other side for an open engine architecture affording easy placement of and access to fuel injectors and intake and exhaust manifolds on the cylinders. Such single-side mounting of the crankshafts also permits the one side of the cylinders, with intake and exhaust manifolds mounted thereto, to be shielded from liquid splashed by operation of the crankshafts and connecting rods. Reduction of the number of connecting rods per piston would decrease the number of throws and thus the length required for each crankshaft. These reductions would decrease the weight and simplify the construction of the engine and crankshafts.

SUMMARY

Two crankshafts of an opposed piston engine are single-side mounted with respect to the cylinders, which is to say that the crankshafts are mounted to one side of the cylinders so that their axes of rotation lie in a plane that is spaced apart from and parallel to a plane in which the axes of the cylinders lie.

Location of the crankshafts to one side of the cylinders frees up space and access on the side that does not face the crankshafts for easy placement and support of fuel injectors and intake and exhaust manifolds on the cylinders.

Location of the crankshafts to one side of the cylinders permits the side that does not face the crankshafts to be shielded from liquids splashed by operation of the crankshafts and to be open to the ambient atmosphere for cooling.

Each piston of the engine is coupled to only one crankshaft by a single linkage articulated by a crosshead. The piston has a piston rod affixed at one end to the piston. The other end of the piston rod is affixed to the crosshead pin. One end of a connecting rod swings on the pin and the other end is coupled to a throw on a crankshaft.

Because each piston is coupled to only one crankshaft, the number of connecting rods is reduced, as are the number of throws, the length, and the weight of the crankshafts. As a result, the weight of the engine is lower than that of the side mounted configuration.

In order to eliminate the effect of side forces acting on a piston through the single connecting rod, each linkage is constrained to reciprocate between fixed guides, in alignment with the piston rod to which it is coupled.

BRIEF DESCRIPTION OF THE DRAWINGS

The below-described drawings illustrate principles and examples discussed in the following description. These drawings are not meant to limit application of the principles set forth herein to the illustrated embodiments, nor are they necessarily to scale.

DETAILED DESCRIPTION OF THE PREFERRED EMBODIMENTS

This specification describes a construction for an opposed piston, compression ignition engine with one or more cylinders, each housing a pair of opposed pistons. The engine includes a pair of spaced-apart crankshafts single-side mounted with respect to the cylinders. That is to say, the crankshafts are located to one side of the cylinders where their axes of rotation lie in a plane that is spaced from and parallel to a plane in which the central axes of the cylinders lie. The crankshafts and cylinders are oriented so that the direction of the crankshaft axes is perpendicular to the direction of the central axes of the cylinders. Each piston includes a piston rod, affixed at one end to the interior of the piston, with a single connecting rod for each piston.

In this engine, a crosshead for each piston acts as a hinge between one end of a piston rod and an end of a connecting rod. The crosshead constrains or guides the end of the connecting rod along a straight path by guides which receive the side thrust of the connecting rod. Preferably, the crosshead is a sliding crosshead in that it includes a portion adapted to slide between the guides.

For purposes of narration only, one exemplary engine set forth is a four cylinder engine, with variations as noted herein. However the principles to be described and illustrated are not limited in this way and may apply to opposed piston engines with one cylinder, or with two or more cylinders.

In this specification, the term "coupling" denotes a linkage of two elements between which there is relative movement, without rigidly and directly attaching one element to the other.

When used in this specification, the term "collar" denotes a circular part which receives and pivots or swings on another part, for example, a pin.

Engine Construction

Figure 1:
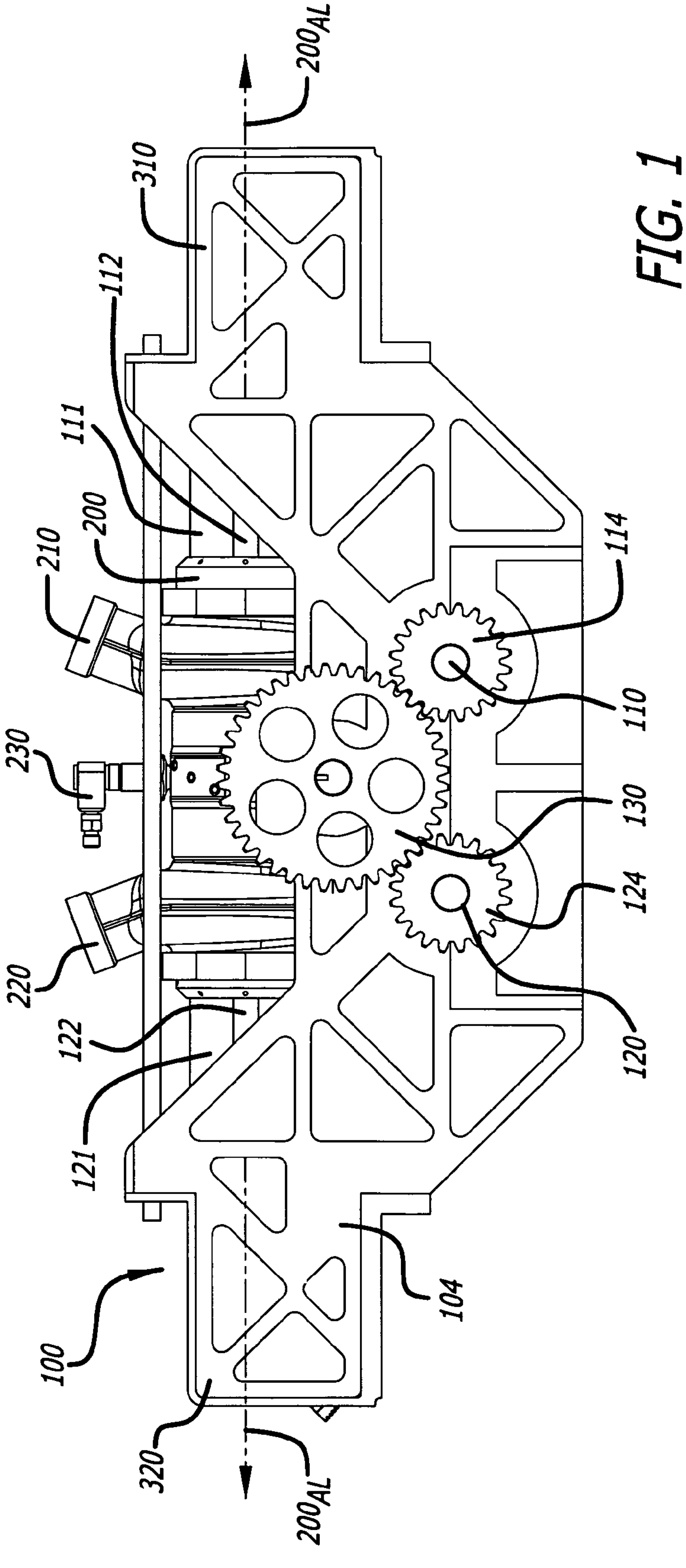
FIG. 1 is a front view of a four cylinder configuration of an opposed piston, compression ignition engine with crossheads.

FIG. 1 illustrates an opposed piston engine 100. The engine 100 includes a rigid, heavy duty frame 104 that supports one or more cylinders 200, two crankshafts 110, 120, an output drive 130, and crosshead assemblies 310, 320. Drive gears 114, 124 are mounted to output ends of the crankshafts 110, 120, respectively, and engage an input gear on the output drive 130 such that the crankshafts rotate in the same direction. Bearing supports for the crankshafts and the output drive may be formed integrally with the frame. Preferably, cylinders and associated intake and exhaust manifolds are not formed, integrated, or cast in one piece with the frame, but are separate therefrom, and may be removably or permanently affixed to the frame. The engine 100 is shown with a top cover removed with one cylinder 200 partially visible. The output drive 130 and its associated gear are shown at a twelve o'clock position (above) the drive gears 114, 124. This is not meant to limit the arrangement of the crankshafts and the output drive; for example, the output drive 130 and its associated gear may be at a six o'clock position (below) the drive gears 114, 124.

Figure 2:
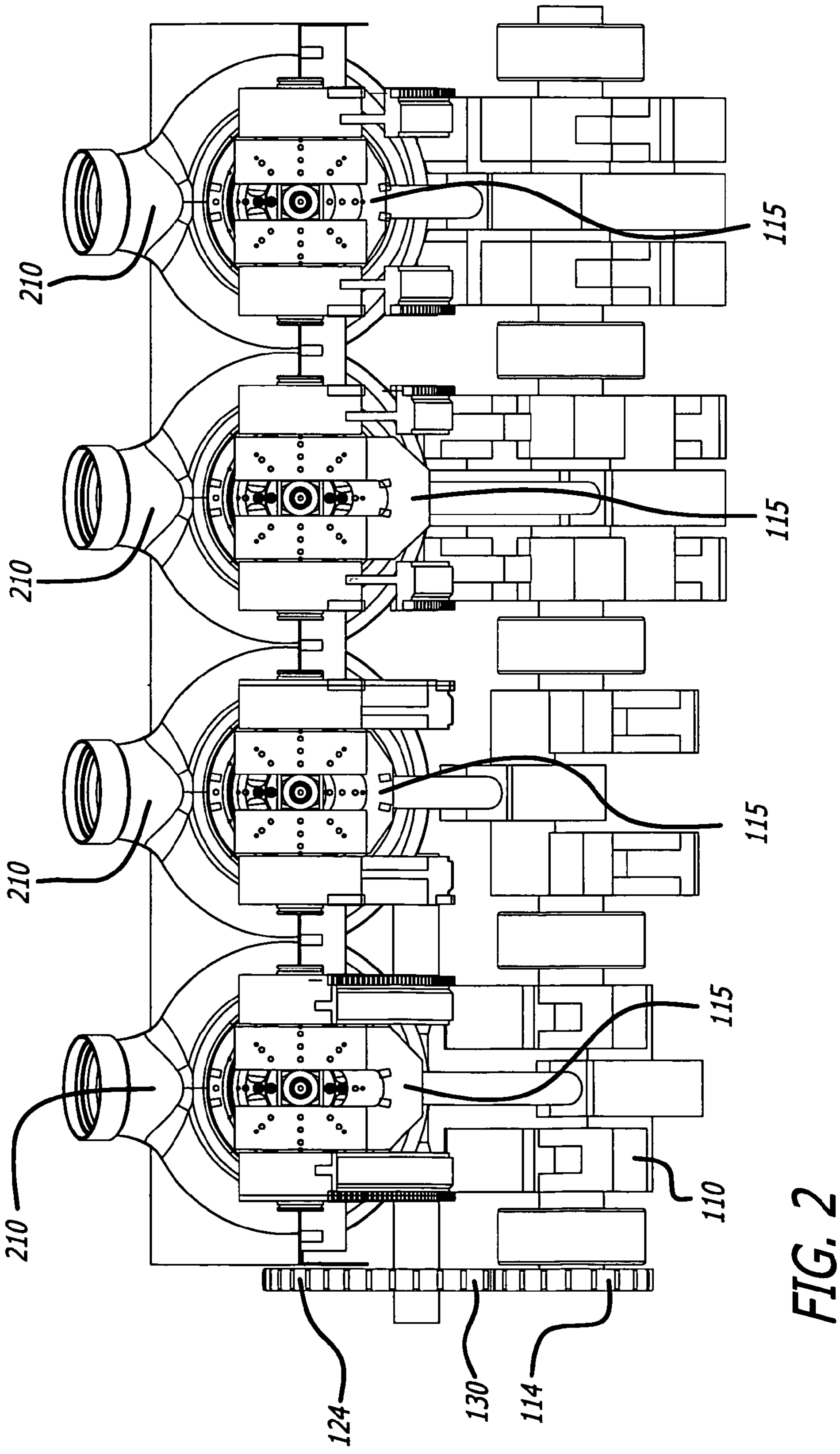
FIG. 2 is a side sectional view of the engine, seen through a longitudinal central plane of the engine.
Figure 3:
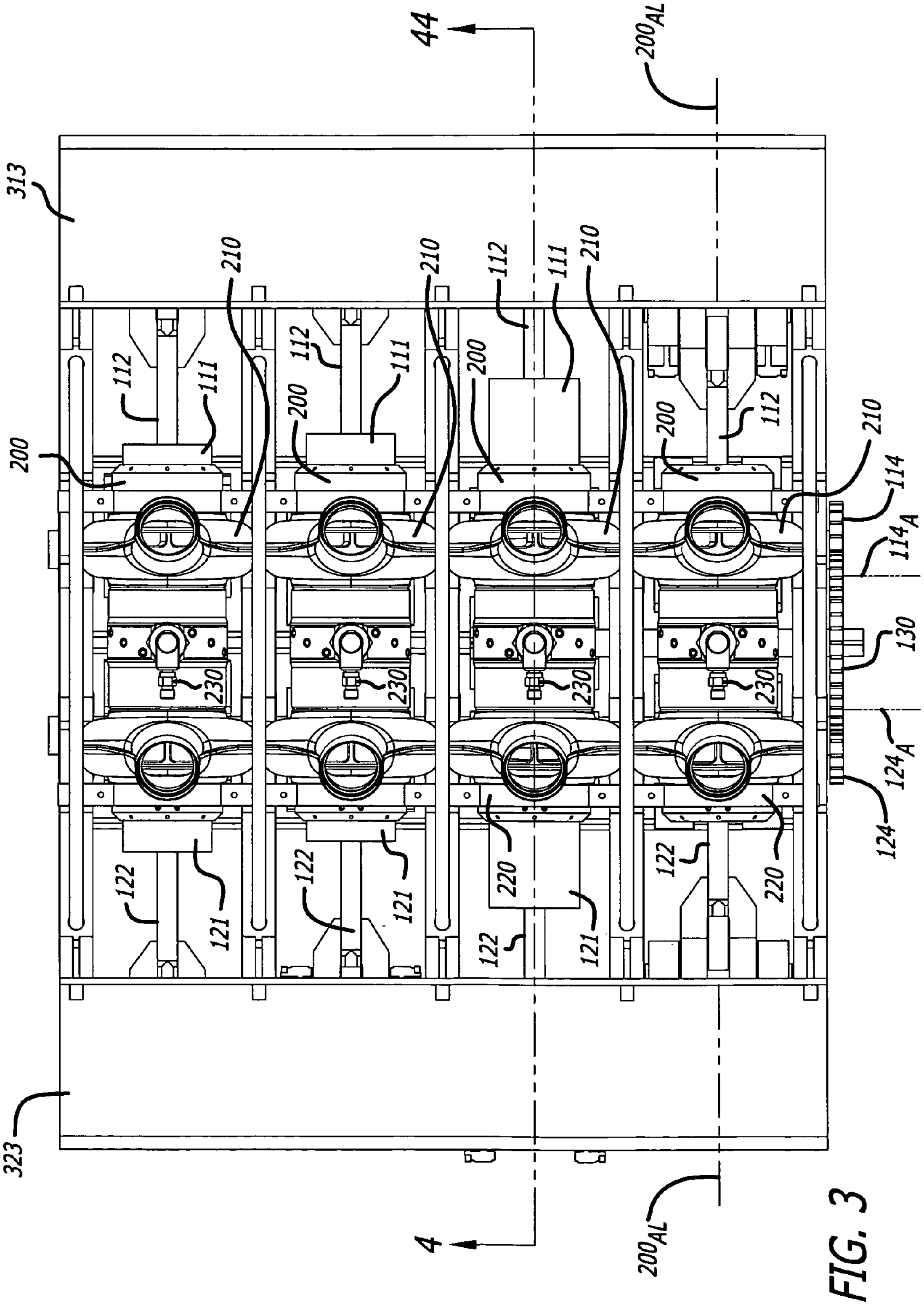
FIG. 3 is a top plan view of the engine.

FIGS. 2 and 3 show the respective locations and relationships of the cylinders 200 of the engine 100. In this regard, the cylinders are aligned laterally in a rank or a row such that their longitudinal axes are mutually parallel and lie in the same plane, which is generally horizontally disposed with respect to the frame 104. Each cylinder includes an intake port in communication with an intake manifold 210 near one end and an exhaust port in communication with an exhaust manifold 220 near the opposite end. The cylinders 200 are oriented so that the intake manifolds 210 and exhaust manifolds 220 are disposed in rows toward respective sides of the engine 100. For convenience, but without any limitation, in this specification the respective sides of the engine 100 may be termed "intake" and "exhaust" sides because of their orientations toward the corresponding intake and exhaust manifolds. Each cylinder includes at least one fuel injector 230 mounted thereto.

The rank or row of cylinders is preferably disposed in the engine 100 to be substantially horizontal therewith when the engine is oriented as per FIG. 1. In the rank or row formed by the cylinders, there are two sides, on each of which the full length of all the cylinders can be seen. With the orientation of the engine 100 as shown in FIG. 1, for example, the sides would include a top side visible in FIG. 3, and a bottom side opposite the top side. The rank or row of cylinders also includes opposing lateral edges where the full length of a single cylinder can be seen and opposing end edges where ends of all the cylinders can be seen.

As may be appreciated with reference to FIG. 1, the crankshafts 110, 120 are disposed in a "single-side mounted" configuration with respect to the cylinders, which is to say that the crankshafts are both disposed to face the same side of the rank or row of cylinders; for example, the crankshafts are disposed to face the bottom side of the rank or row of cylinders as in FIG. 2. Stated another way, when the crankshafts 110, 120 are disposed in a single-side mounted configuration, they have axes of rotation (denoted by the central "x" in each crankshaft in FIG. 1) in a plane that is spaced from and parallel to the plane containing the longitudinal axes of the cylinders (represented by the longitudinal axis $\mathbf{200}_{AL}$ of the cylinder 200 that is visible in FIG. 1). As best seen in FIG. 3, the crankshafts and cylinders are oriented so that the direction of the crankshaft axes $\mathbf{114}_A$ and $\mathbf{124}_A$ is perpendicular to the direction of the central axes (one indicated by $\mathbf{200}_{AL}$) of the cylinders. The advantages of this construction are manifest in FIGS. 1-3: the fuel injectors 230 and the intake and exhaust manifolds 210 and 220 are easily accessible on the side of the row of cylinders opposite that which faces the crankshafts 110, 120, if the top cover of the engine 100 is moved or removed.

Cylinder and Piston Assembly Construction

Figure 4:
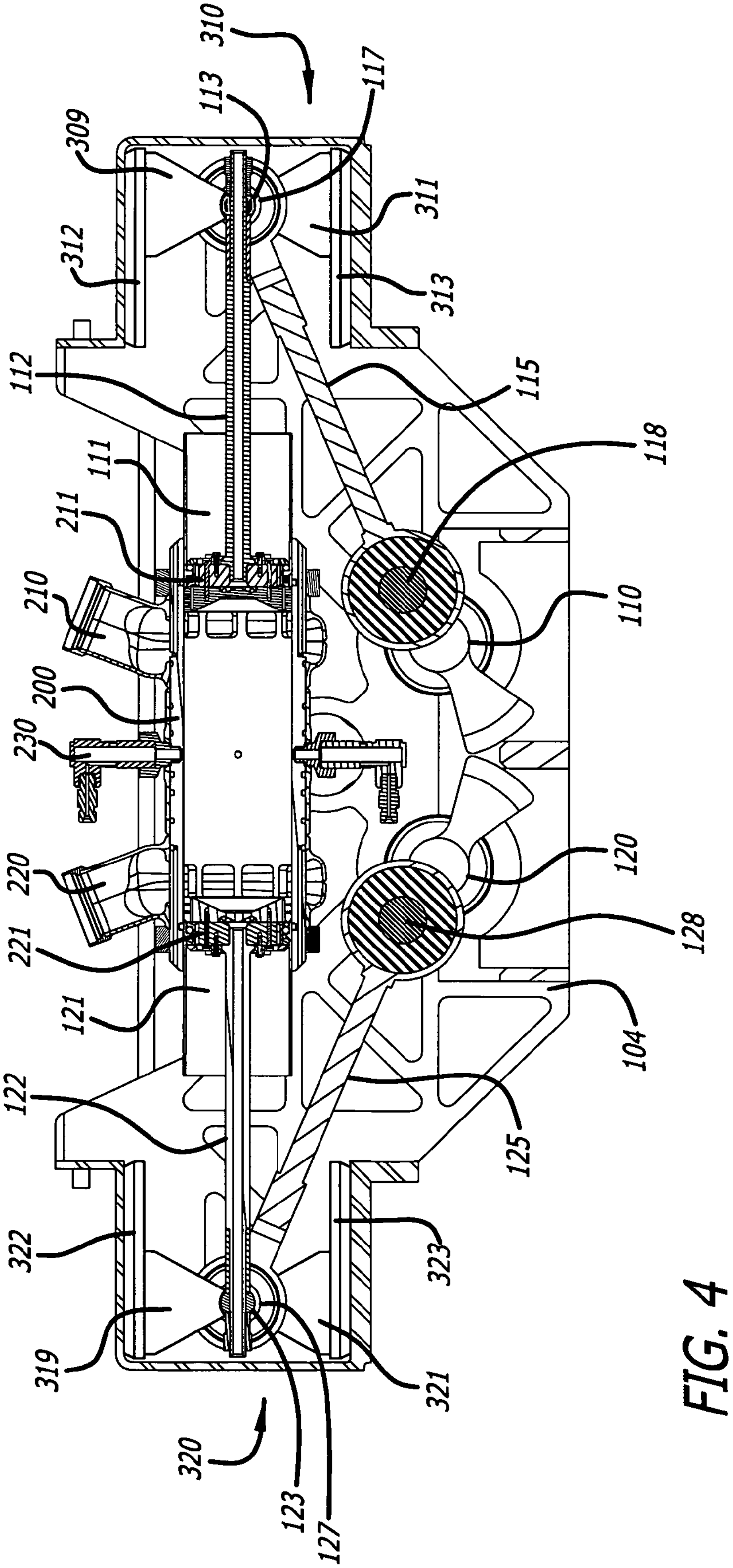
FIG. 4 is a cross sectional view of one cylinder of the engine.

With reference to FIG. 4, the construction of one cylinder 200, the pistons it contains, and the linkages between the pistons and the crankshafts of the engine 100 will be set forth, with the understanding that the description applies to all of the cylinders of the engine 100. The cylinder 200 contains a pair of opposed pistons 111, 121 disposed crown-to-crown to reciprocate in the liner of the cylinder 200. A linkage coupling the piston 111 to the crankshaft 110 includes a piston rod 112 and a connecting rod 115. The piston rod 112 is centered on and affixed at one end to the back of the crown of the piston 111; the other end of the piston rod 112 is affixed to the pin 113 of a crosshead. One end of the connecting rod 115 is coupled by a bearing 117 to the pin 113; the other end is coupled by a bearing 116 to a throw 118 of the crankshaft 110. A linkage coupling the piston 121 to the crankshaft 120 includes a piston rod 122, a connecting rod 125. The piston rod 122 is centered on and affixed at one end to the back of the crown of the piston 121; the other end of the piston rod 122 is affixed to the pin 123 of a crosshead. One end of the connecting rod 125 is coupled by a bearing 127 to the pin 123; the other end is coupled by a bearing 126 to a throw 128 of the crankshaft 120. Each cylinder 200, its opposed pistons 111 and 121, and its intake and exhaust manifolds 210 and 220 constitute a "cylinder and piston assembly".

The bearings 116, 126 may be roller bearings or hydrodynamically lubricated journal bearings. If the bearings 116, 126 are roller bearings, lubrication is provided to them by splashing from a sump (not shown) at the bottom of the engine frame 104; if journal bearings are used, the crankshafts 110, 120 must be constructed to provide pressurized lubricant to the bearing interfaces. The bearings 117, 127 may be roller bearings.

The four cylinder and piston assemblies of the engine 100 operate identically according to the well-known diesel cycle, although with offset phases. During an engine operating cycle, the pistons 111, 121 move toward each other during a compression stroke, passing through respective top dead center (TDC) locations, and move away from each other during a power stroke, passing through respective bottom dead center (BDC) locations. In FIG. 4, the pistons 111, 121 are shown during a power stroke, moving towards BDC. Later, when the pistons 111, 121 are near BDC, they transition to a compression stroke during which they will move back toward TDC. During the operating cycle of the engine 100, the pistons 111, 121 control the cylinder intake and exhaust ports 211 and 221, respectively. In this regard, the crankshafts 110, 120 rotate clockwise and introduce a phase difference that causes the piston 121 to lead the piston 111 during a cycle. This ensures that the exhaust port 221 opens before the intake port 211 so that combustion gasses blow down through the exhaust port 221 before the intake port 211 opens. The intake port 211 then opens allowing pressurized air into the cylinder to scavenge any remaining spent gasses out the exhaust port 221. The following section sets out this operating cycle in more detail.

Operating Cycle

Figure 5:
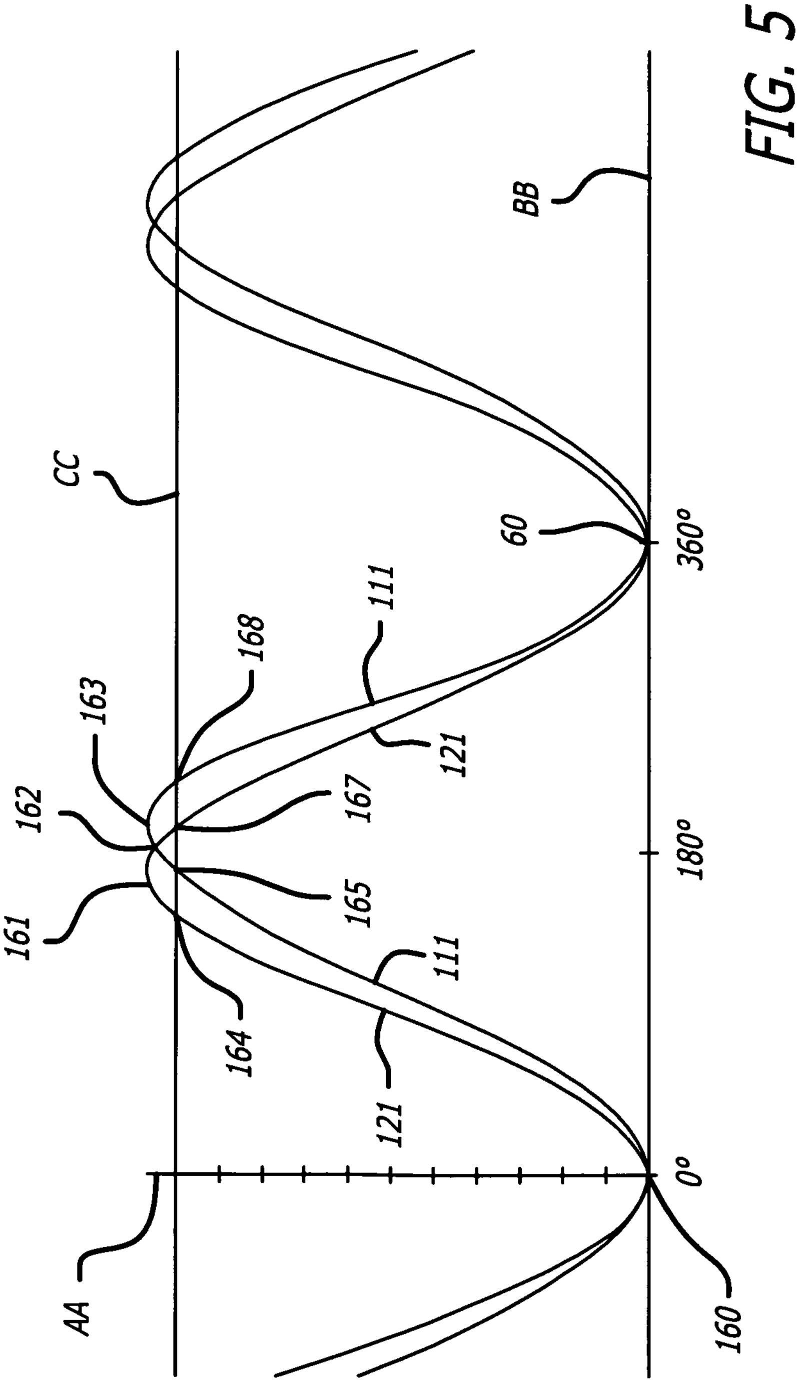
FIG. 5 is a plot showing a preferred phasing of piston motions within one cylinder of the engine.

FIG. 5 is a plot showing the phasing relationship of the exhaust-side 121 and intake-side 111 pistons during an engine operating cycle. The axis AA on the plot indicates the distance the pistons travel away from or towards TDC 160 during 360° revolutions of their respective crankshafts; the axis BB indicates the amount of crankshaft rotation; and the line CC indicates the position at which the pistons open their respective ports. For example, at 160 the pistons are at TDC and in phase. As the power stroke begins, the exhaust-side piston 121 leads the intake-side piston 111 as both are driven toward BDC. At 164, the crown of the exhaust-side piston 121 opens the exhaust port, initiating an exhaust cycle. At 165, the crown of the intake-side piston 111 opens the intake port; now, both the exhaust and intake ports are open and scavenging commences. At 161, the exhaust-side piston 121 reaches BDC, and then at point 163 the intake-side piston 111 reaches BDC. At point 162 both pistons are briefly at equidistant from TDC. At point 167 the exhaust-side piston 121 closes the exhaust port so that air entering through the intake port is contained within the chamber of the cylinder. At point 168 the intake-side piston 111 closes the intake port and the compression cycle commences as both pistons move toward TDC 160. At 360° of rotation 160 (TDC, in other words) the cycle repeats.

Crankshaft Construction

Figure 6A:
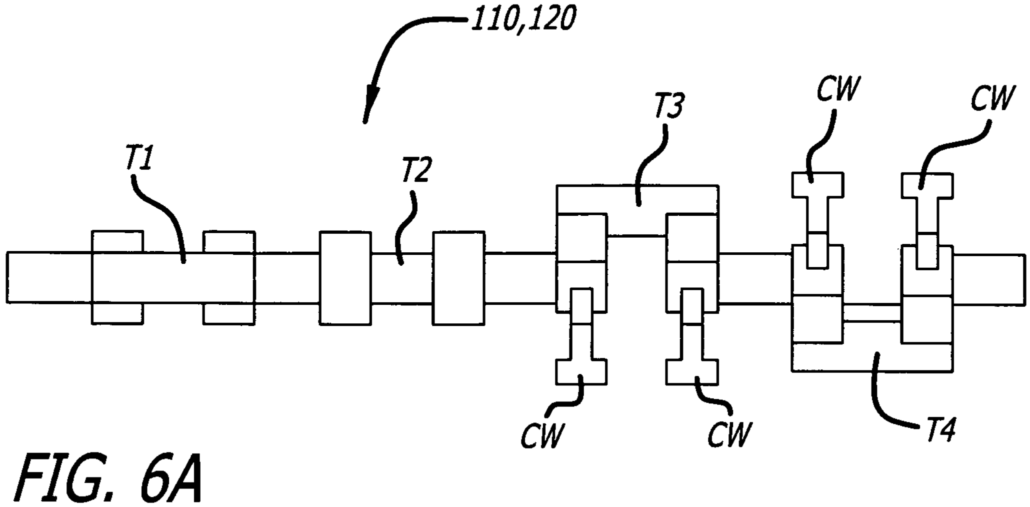
FIG. 6A is a side view of a crank shaft of the engine.
Figure 6B:
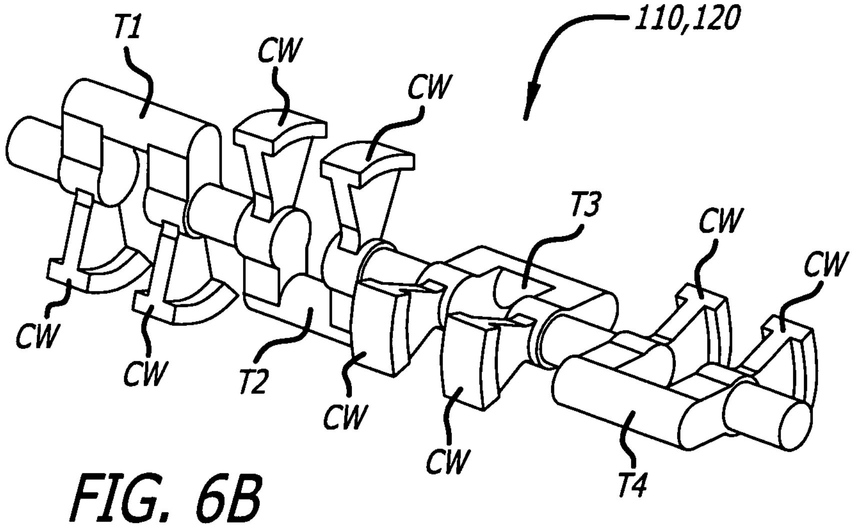
FIG. 6B is a perspective view of one crankshaft of FIG. 6A.

FIGS. 6A and 6B illustrate a preferred crankshaft construction for the four cylinder example of the engine 100 of FIG. 1. The crankshafts 110, 120 are identical, each including four throws T1-T4, each balanced by a pair of counterweights CW. In this engine, each throw is coupled, through a single connecting rod/crosshead/piston rod linkage, to a single piston on a respective side of the engine. Thus, for example, as in FIG. 1, the throws of the crankshaft 110 are coupled to intake-side pistons 111, and the throws of the crankshaft 120 are coupled to exhaust-side pistons 112. Preferably, the rotational relationships of the throws along the crankshafts establish offsets between the operational cycles of the cylinder and piston assemblies. These offsets may be chosen to establish a preferred firing sequence, for example: 1-3-2-4, with a preferred rotational spacing, for example, a spacing of generally 90°, between firings. In this regard, with reference to FIGS. 6A and 6B, taking the end throw T1 as signifying the first cylinder and piston assembly, in each crankshaft 110, 120, the third throw T3 is 90° out of phase with the end throw T1, the second throw T2 is 180° out of phase with the first throw T1, and the end throw T4 is 270° out of phase with the first throw T1. The crankshafts 110, 120 are mounted to the frame 104 with a mutual angular offset that establishes a preferred phasing between the pistons in each cylinder in order to control the phasing between intake and exhaust port operations, as illustrated, for example, in FIG. 5.

Crosshead Assembly Construction

With reference to FIG. 4, the piston rods 112, 122 of the opposed pistons 111, 121 are jointed where they meet the connecting rods 115, 125. As is evident from FIG. 4, the locations of the crankshafts 110, 120 cause each piston and connecting rod pair to maintain an acute angle during the entire engine operating cycle. As a consequence, reciprocation of the connecting rods continuously generates lateral forces during engine operation that must be kept from the piston rods. For this purpose, a crosshead assembly is provided for the linkage coupling each piston to a crankshaft. Two crosshead assemblies 310, 320 are seen in FIG. 4. One crosshead assembly 310 couples the piston rod 112 to the connecting rod 115; the other crosshead assembly 320 couples the piston rod 122 to the connecting rod 125. The crosshead assembly 310 includes a joint external to the piston 111 that is constituted of the pin 113, a first bearing 309, and a pair of second bearings 311. The crosshead assembly 310 further includes a guide constituted of a first rail 312 on which the first bearing slides and a pair of second rails 313 on which the second bearings slide. Similarly, the crosshead assembly 320 includes a joint external to the piston 121 constituted of the pin 123, first and second bearings 319 and 321, and a guide constituted of first and second rails 322 and 323 on which the first and second bearings slide. First and second rails are fixed to opposing inner surfaces of U-shaped enclosures 325 and 326 disposed on opposite sides of the engine frame.

All of the crosshead assemblies of the engine 100 are identical in construction and operation, and the following description applies to all of the crosshead assemblies. Per FIG. 7A, the forked end 330 of the connecting rod 115 carries spaced apart collars 331 through which the pin 113 fits. Roller bearings (not seen) rotatably support the collars 331, allowing them to pivot or swing on the pin 113. The end of the piston rod 112 extends between the collars 331 and diametrically penetrates the pin 113 at the pin's longitudinal midpoint, where it is affixed to the pin. The outside bearing 309 is centered longitudinally on the pin 113, between the collars 331. The inside bearings 311 are disposed laterally on the pin 113, each on the outside of a respective collar 331, so that the collars 331 and the crosshead bearing 309 are sandwiched therebetween. The bearings 309 and 311 bear against the pin, on opposite sides thereof, perpendicular to the piston rod 112. Preferably, each bearing 309, 311 is a wedge with a concave bearing surface at the narrow end to receive the curved surface of the pin 113 and an elongate, planar bearing surface at the wide end to slide on a guide.

Figure 7A:
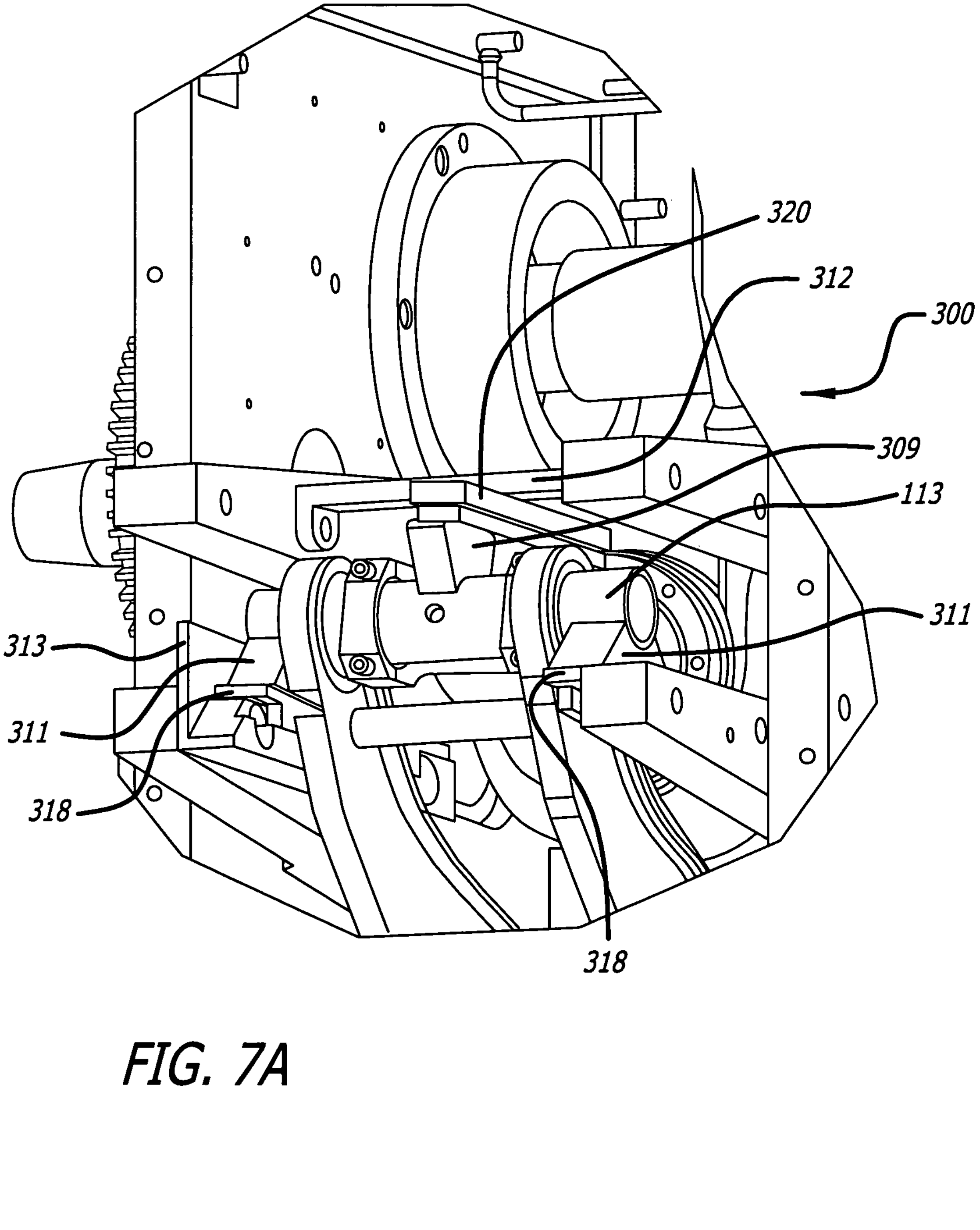
FIG. 7A is a perspective view of one crosshead assembly of the engine.
Figure 7B:
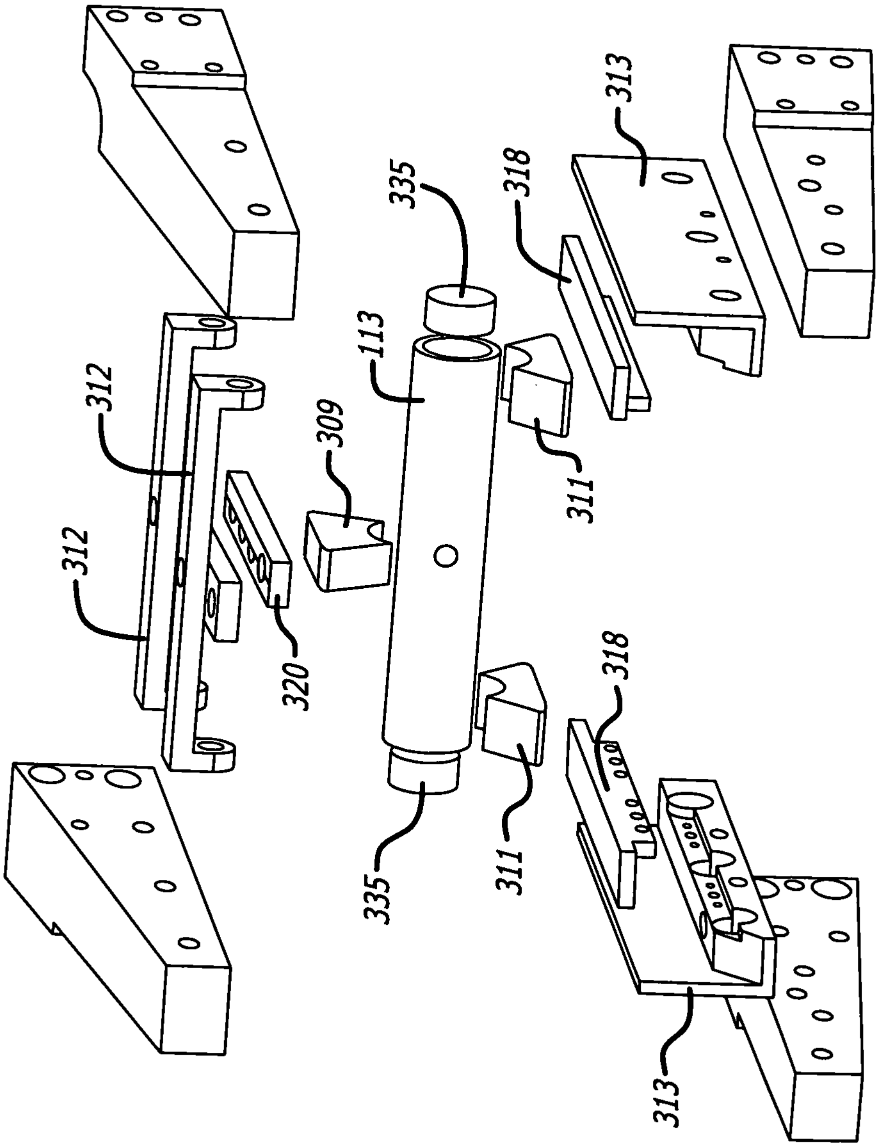
FIG. 7B is an exploded isometric view of the crosshead assembly of FIG. 7A.

With reference to FIG. 7B, the rail 312 is disposed between and in opposition to the rails 313. The rail 312 is oriented transversely to the center of the pin 113, while the rails 313 are spaced apart laterally along the pin 113 with the rail 312 centered therebetween. The rails 313 are oriented transversely to the pin 113, preferably at or near the ends of the pin 113. The ends of the pin 113 may be strengthened by inserting plugs 335. When the crosshead assembly is put together, the planar surface of the bearing 309 slides against the rail 312 and the planar surfaces of the bearings 311 slide against the rails 313 as the pin 113 reciprocates during engine operation.

Elimination of Side Forces

As seen in FIG. 7A, at least three forces act upon the crosshead assembly 310 during engine operation. Combustion and compression pressures exert an axial force F1 along the piston rod 112 towards the pin 113. At the same time, tensile forces F2 acting upon the connecting rod 115 are exerted in an angular direction towards the crankshaft 110. These two forces result in a inward force F3 on the crosshead assembly 310 directed through the bearings 311 towards the inside rails 313. Thus, as the engine operates, the inward force F3 will be transferred to the inside rails 313 as the planar surfaces of the bearings 311 slide thereon. However, as the pistons move towards TDC during engine startup and operation, it is possible for F3 to momentarily reverse in direction and become an outward force exerted upon the pin 113. To avoid any possible outward movement, the outside rail 312 is located opposite the inside rails 313 so as to be in constant sliding contact with the planar surface of the crosshead bearing 309 as the engine operates. Thus, the crosshead assemblies of the engine prevent the application of side forces (the outward and inward directions of F3, for example) from being applied to the piston rods by the connecting rods.

Due to the operation of the crosshead assemblies, there is no longer a requirement to couple each piston to two crankshafts in order to achieve a balance of forces on the piston rods. As a consequence, every piston in the engine is coupled to a single crankshaft by way of a single connecting rod. This is clearly seen on the intake side of the engine 100 in FIG. 2, where each of the pistons 111 is coupled to a single crankshaft 110 by way of a single connecting rod 115.

Engine Assembly

With reference to FIG. 1, the construction of the engine 100 should isolate the cylinders from engine liquids while allowing easy access to and removal of the cylinder and piston assemblies for maintenance. In this regard, the engine frame 104 of FIG. 1 may be constituted of a cylinder frame and a base. The cylinder frame retains the cylinders in a rank or row alignment. Preferably, the rank or row of cylinders is generally horizontal when the engine is assembled and oriented as shown in FIG. 1. The base supports and retains the cylinder frame and rotatably supports the crankshafts and the output drive. Both the cylinder frame and the base may be fabricated by casting and/or machining a durable, heavy duty material such as forged steel.

Figure 8A:
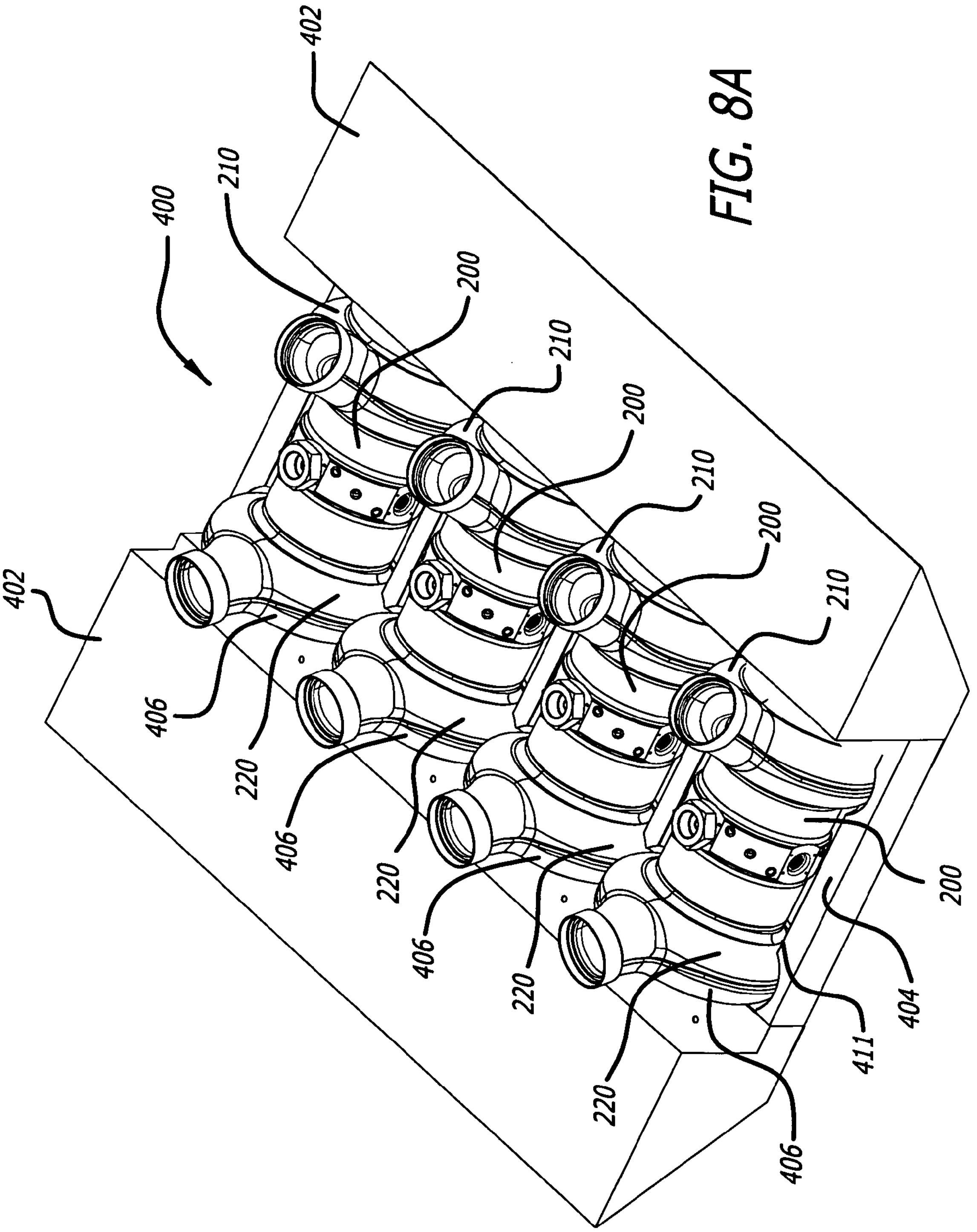
FIG. 8A is a perspective view of a cylinder frame with cylinder-piston assemblies mounted therein.
Figure 8B:
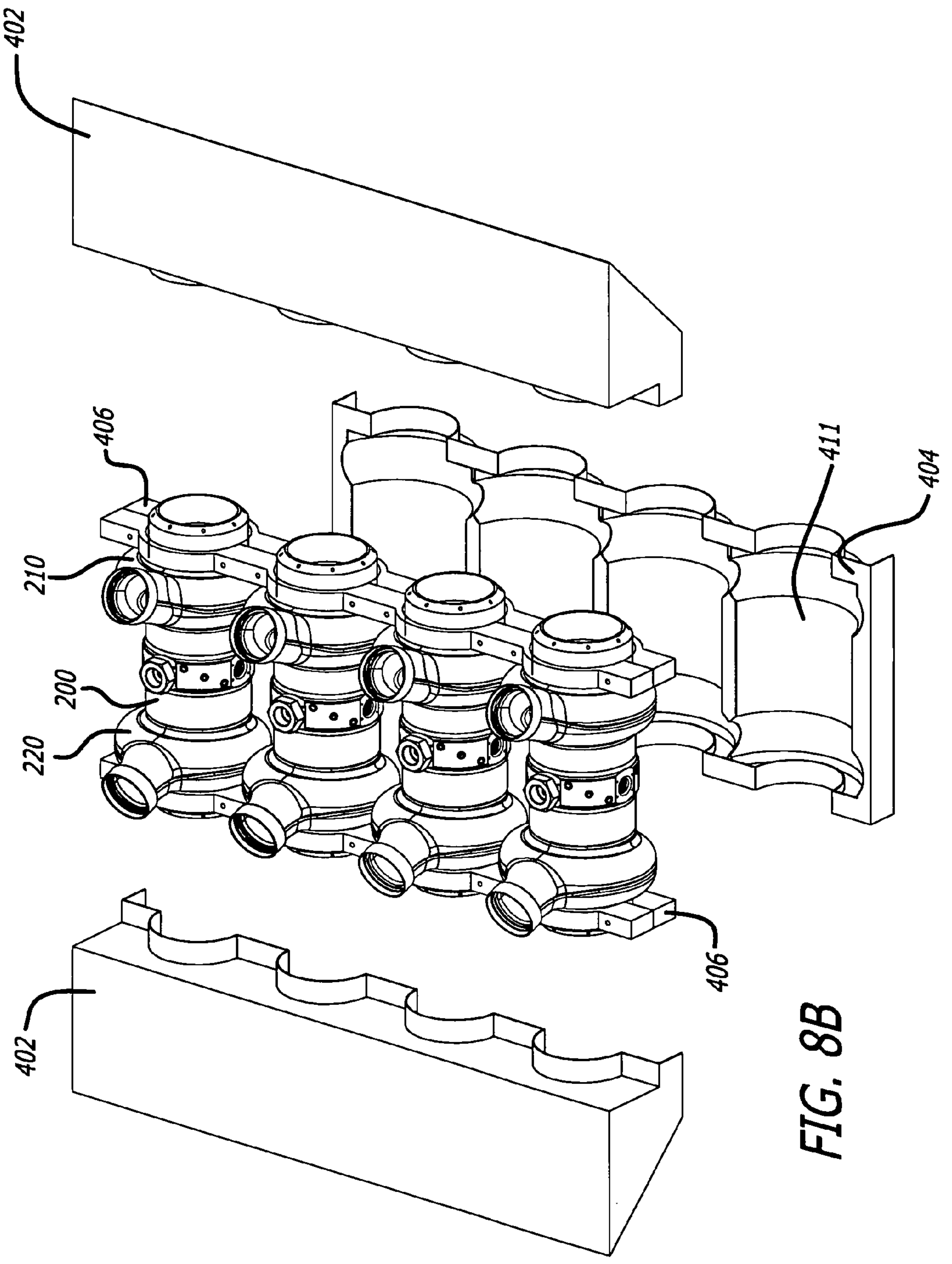
FIG. 8B is a perspective view of the cylinder frame disassembled.

In FIG. 8A the cylinder frame 400 is shown apart from the engine frame; in FIG. 8B, the cylinder frame is shown disassembled into its major component parts. The cylinder frame 400 has two lateral splash shields 402, each a generally elongated closure, with a quadrilateral cross-section, that is substantially open on two sides. The frame 400 has a floor structure 404. The upper halves of the cylinders 200 fit through wells 411 in the floor structure 404 and the ends of the cylinders extend through the splash shields 402. End brackets 406 secure the cylinders 200 to the cylinder frame 400. Together, the splash shields 402, the cylinder frame 400, and the cylinders 200 prevent liquid being splashed from the base past the cylinder frame. The upper halves of the cylinders 200 are thereby shielded from liquids that lubricate and cool engine elements and that splash about in the base. For example, the cylinders 200 and the pistons 111, 121 may be cooled as disclosed in U.S. Pat. No. 7,156,056 by a pressurized liquid comprising a lubricant that flows across the cylinder liners and out of their intake and exhaust ends, and that flows out the lower ends of the piston skirts. The lubricant flowing out of the cylinders and pistons will flow over and lubricate the surfaces and bearings of the linkage and crosshead elements. However, the splash shields 402 are so positioned as to prevent the exiting lubricant from reaching the upper halves of the cylinders 200, and the intake and exhaust manifolds mounted thereto; instead, the splash shields 402 direct the exiting lubricant to a sump (not shown) at the bottom of the engine frame 104.

One benefit realized with such a splashguard construction is the exposure of at least a portion of the cylinder peripheral surfaces to air, which aids cooling. Another benefit is the prevention of coking and smoke cause by lubricant splashing the exhaust manifolds which become very hot during engine operation.

Figure 8C:
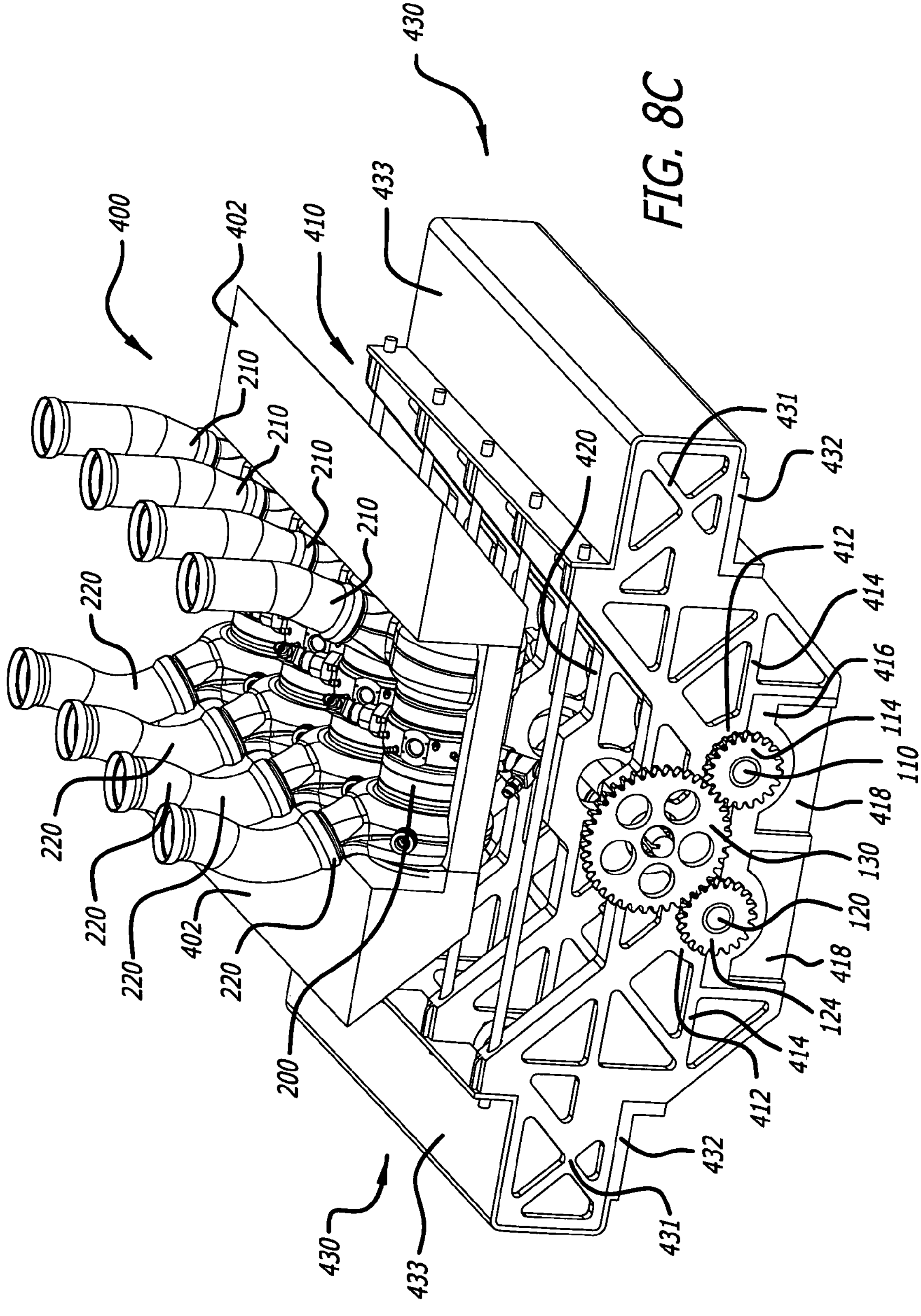
FIG. 8C is a perspective view of the cylinder frame with respect to a base.

As per FIG. 8C, the base 410 is a rigid, heavy duty frame; for example, a trussed frame construction may be used. Each crankshaft is rotatably supported on the base 410 by upper crankshaft bearing retainers 412 in crossbeams 414 and lower crankshaft bearing retainers 416 formed in beam sections 418 that are secured to the crossbeams 414. The output drive shaft is rotatably mounted on the base 410 in bearing retainers 420 formed between base trusses. Opposing crosshead guide enclosures 430 are attached to outwardly-projecting flanges 431 on opposite sides of the base 410. Each crosshead guide enclosure 430 includes a partial-U-shaped guide structure opposing sides of which support opposing guide rails as per FIG. 7A.

Figure 8D:
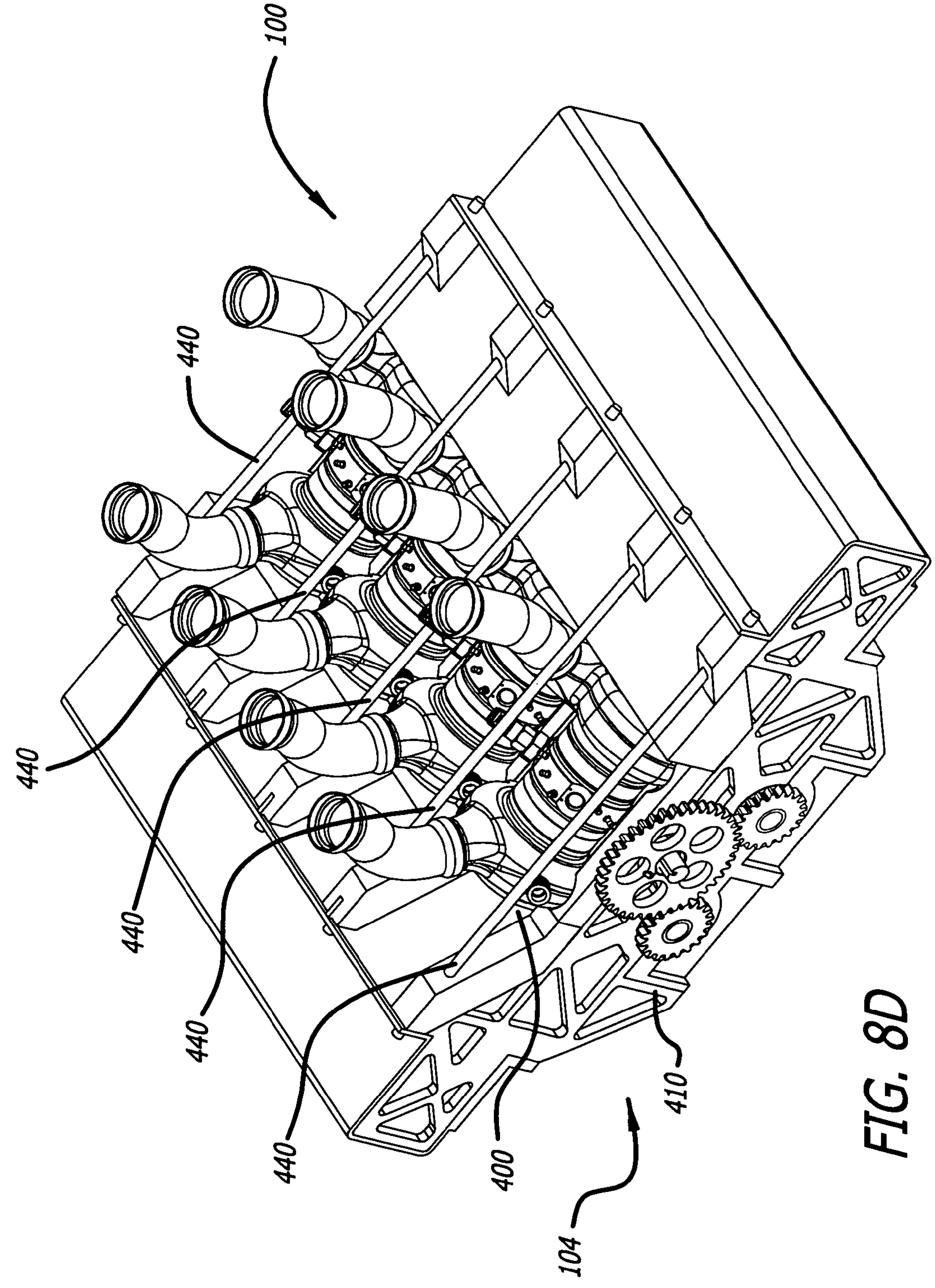
FIG. 8D is a perspective view taken downwardly through the engine frame.
Figure 8E:
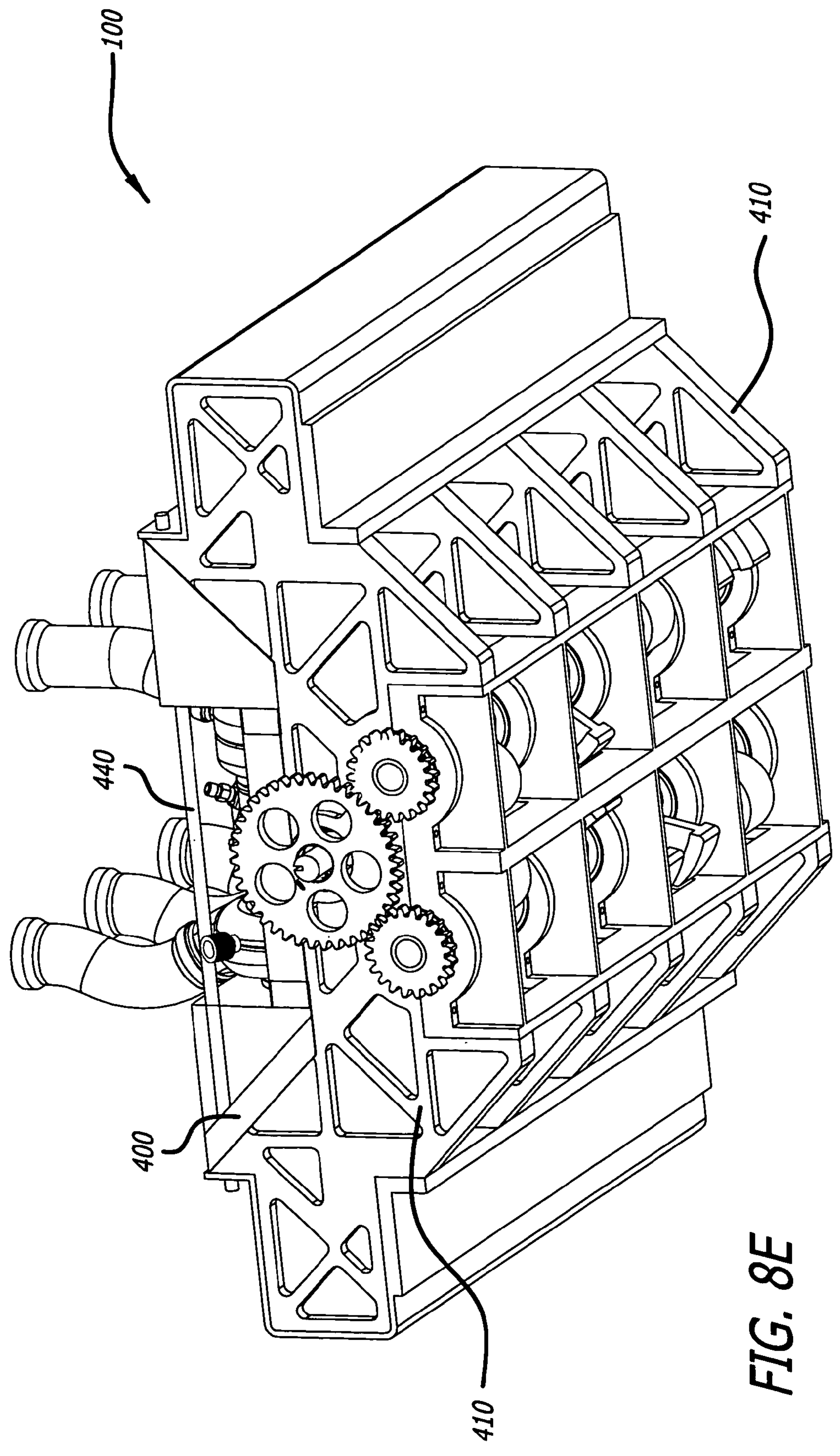
FIG. 8E is a perspective view taken upwardly through the engine frame.

As per FIGS. 8D and 8E, the engine frame 104 is assembled by mounting the crankshafts and output drive to the base 410, fixing the cylinder frame 400 to the base 410 by threaded bolts (not seen) through the floor structure 404, coupling the connecting rods to the crankshafts, assembling the crossheads to the crankshafts and piston rods, securing the crosshead guide enclosures 430 to the base 410 with tie rods, and then connecting opposing sides of the frame 104 by tie rods 440 that extend across the cylinders 200. Alternatively, instead of being bolted, the cylinder frame 400 may be welded to the base 410.

Engine Speeds

Returning to FIG. 1, the two engine drive gears 114 and 124 are attached to respective crankshafts 110 and 120. These drive gears 114 and 124 both rotate in the same direction (clockwise, for example) to drive a single output drive gear 130 in the opposite direction (counterclockwise, for example.

Various ratios between these gears may be used. For example, presuming that the drive gears 114 and 124 are twice the diameter of the output gear 130, the output drive would have twice the speed (RPM) of the engine reciprocation rate (ERR). Alternately, if the three gears were the same diameter, the ERR and RPM for the engine would be the equal. And, if the drive gears were half the diameter of the output gear, the engine RPM would be half the ERR. Therefore, as an example, if the ERR of the engine were 3600 the output of the engine can be selected to be 1800 (per FIG. 1), 3600 or 7200 RPM depending upon the ratio of the diameters of the drive gears to the output gear. Intermediate ratios are also possible.

Alternate Engine Configuration

Figure 9:
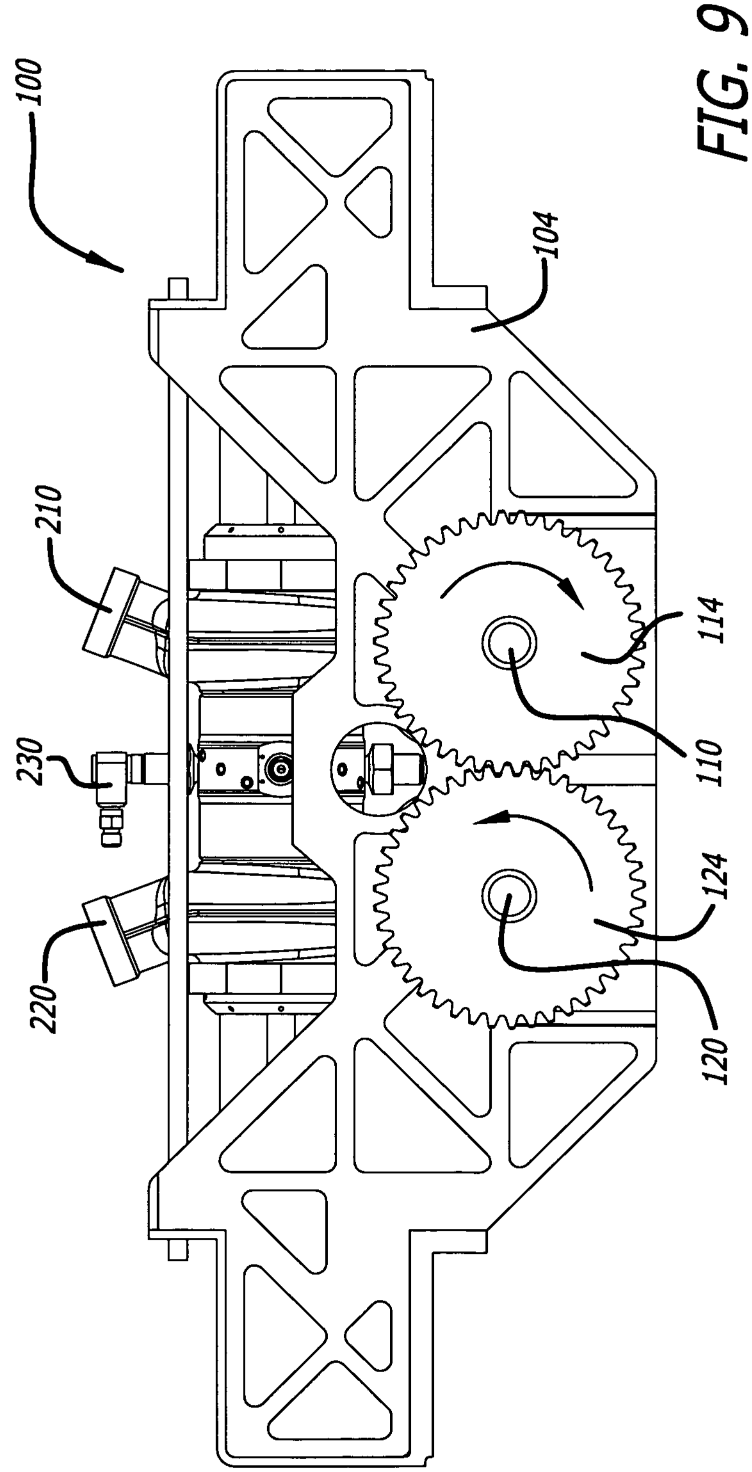
FIG. 9 is a front view of an engine configuration with counter-rotating crankshafts.

FIG. 9 shows another configuration of the engine illustrated in the preceding figures from which the output drive is removed, and in which the two drive gears 114 and 124 are mutually engaged. That is to say, the outward-facing gear teeth of each gear mesh with the teeth of the other gear. Accordingly, the crankshafts 110, 120, and their attached drive gears, rotate in opposite directions. In this configuration, the intake-side crankshaft 110 attached to drive gear 114 rotates in one direction (for example, in a clockwise direction), and the exhaust-side crankshaft 120 attached to drive gear 124 rotates in an opposite direction (a counterclockwise direction, for example). While rotating in opposite directions, the two crankshafts are in phase with each other and the exhaust-side and intake-side pistons are in phase because there is no offset of the connecting rods attached to their respective crankshafts. This results in an opposed-piston engine capable of being well-balanced with an engine architecture having only a single cylinder and piston assembly, or, if required, an engine architecture with multiple cylinder and piston assemblies arranged in a rank or row. Of course, the engine configuration described in respect of the preceding figures is also a balanced engine because each offset connecting rod of one cylinder is counterbalanced by one of the offset connecting rods of another cylinder.

However, the engine configuration of FIG. 9 has inherent limitations. Since there is no phasing offset of the pistons to control the phasing of intake and exhaust port operations, only one atmosphere of air can be trapped within a cylinder chamber during the compression cycle. This is true for the following reasons. When the pistons are at TDC and ignition occurs, they are driven towards BDC during the power cycle. Since the exhaust port is slightly larger than the intake port, the exhaust port will open first, starting the exhaust cycle. Then the intake port will open and air entering the chamber will start the scavenging cycle since the exhaust port is also open at this period. The pistons reach BDC at the same time and start their movement towards TDC during what would normally be the beginning of the compression cycle if the exhaust port were closed by the exhaust piston while the intake port was still open.

Furthermore, in the engine configuration of FIG. 9 the exhaust port will not close completely until after the intake port is closed; thus, the only air that can be trapped within the cylinder chamber is at one atmosphere. Presuming that this configuration is capable of capturing approximately 700 cc of air at one atmosphere in a cylinder bore diameter of 80 mm, at 3600 RPM this engine could produce 70 hp. However, since only one atmosphere of compression air is required, a light blower will provide sufficient air into the cylinder chamber. This would result in a lighter, more efficient engine.

Although an invention has been described with reference to the presently preferred embodiments, it should be understood that various modifications can be made without departing from the spirit of the invention. Accordingly, the invention is limited only by the following claims.

The invention claimed is:

1. An opposed piston engine, comprising:

a plurality of cylinders aligned in a row, each cylinder having intake and exhaust ports, an intake manifold near an end of the cylinder and in communication with an intake port, and an exhaust manifold near an opposing end of the cylinder and in communication with an exhaust port, and in which the cylinders are aligned such that the intake manifolds are positioned near an intake side of the engine and the exhaust manifolds are positioned near an exhaust side of the engine;

a pair of opposed pistons slidably disposed in each cylinder;

two crankshafts positioned to one side of the row of cylinders so that the axes of rotation of the crankshafts lie in a plane that is spaced apart from and parallel to a plane in which the longitudinal axes of the cylinders lie; and, a linkage between each piston and a respective one of the crankshafts;

a crosshead assembly for each linkage;

in which each crosshead assembly comprises:

spaced-apart opposing guides;

a pin positioned between the guides; and, spaced-apart bearings;

each bearing including a first edge mining the pin and a second edge slidably engaging a respective guide; and, in which each linkage comprises:

a connecting rod having a first end with two spaced-apart collars that rotatably engage a pin between spaced-apart bearings and a second end rotatably engaging a throw of a crankshaft; and a piston rod with a first end affixed to a piston and a second end affixed to the pin between the spaced-apart collars of the connecting rod.

2. The opposed piston engine of claim 1, in which a first bearing is substantially centered on the pin and engages a first guide in a first force direction and a pair of second bearings are laterally spaced on the pin and engage second guides in a second force direction substantially opposite the first force direction.

3. The opposed piston engine of claim 2, in which each bearing is in the shape of a wedge, the first edge has a concave surface at a first end of the wedge, and the second end has an elongate planar surface at a second end of the wedge which is wider than the first end.

4. The opposed piston engine of claim 1, further comprising:

a frame;

bearing supports in the frame rotatably supporting the two crankshafts;

the row of cylinders being removably attached to the frame.

5. The opposed piston engine of claim 4, further comprising first opposing guide plates on the frame near the intake side of the engine in which opposing guides are defined for crosshead assemblies near the intake side of the engine and second opposing guide plates on the frame near the exhaust side of the engine in which opposing guides are defined for crosshead assemblies near the exhaust side of the engine.

6. The opposed piston engine of claim 4, wherein the frame comprises:

a base with the bearing supports;

a cylinder frame in which the row of cylinders is disposed;

the cylinder frame removably attached to the base; and, splash shields cooperating with the base and the cylinder frame to prevent liquid being splashed from the base past the cylinder frame.

7. The opposed piston engine of claim 1, wherein the axes of rotation of the crankshafts run in a direction that is perpendicular to the direction in which the longitudinal axes of the cylinders run.

8. An opposed piston engine, comprising:

a plurality of cylinders aligned in a row, each cylinder having intake and exhaust ports, an intake manifold near an end of the cylinder and in communication with an intake port, and an exhaust manifold near an opposing end of the cylinder and in communication with an exhaust port, and in which the cylinders are aligned such that the intake manifolds are positioned near an intake side of the engine and the exhaust manifolds are positioned near an exhaust side of the engine;

a pair of opposed pistons slidably disposed in each cylinder;

two crankshafts positioned beneath the row of cylinders;

the crankshafts having axes of rotation running in a direction that is perpendicular to a direction in which longitudinal axes of the cylinders run;

a plurality of first linkages, each coupling a respective piston near an intake port only to a first crankshaft;

a plurality of second linkages, each coupling a respective piston near an exhaust port only to a second crankshaft; and, a crosshead assembly for each of the first and second linkages;

in which each crosshead assembly comprises:

spaced-apart opposing guides;

a pin positioned between the guides; and, spaced-apart bearings;

each bearing including a first edge engaging the pin and a second edge slidably engaging a respective guide; and, in which each linkage comprises:

a connecting rod having a first end with two spaced-apart collars that rotatably engage a pin between spaced-apart bearings and a second end rotatably engaging a throw of a crankshaft;

the diameter of the connecting rod collars being greater than the diameter of the crosshead bearing collars; and, a piston rod with a first end affixed to a piston and a second end affixed to the pin between the spaced-apart collars of the connecting rod.

9. The opposed piston engine of claim 8, in which a first bearing is substantially centered on the pin and engages a first guide in a first force direction and a pair of second bearings are laterally spaced on the pin and engage second guides in a second force direction substantially opposite the first force direction.

10. The opposed piston engine of claim 9, in which each bearing is in the shape of a wedge, the first edge has a concave surface at a first end of the wedge, and the second end has an elongate planar surface at a second end of the wedge which is wider than the first end.

11. The opposed piston engine of claim 8, further comprising:

a frame;

bearing supports in the frame rotatably supporting the two crankshafts;

the row of cylinders being removably attached to the frame.

12. The opposed piston engine of claim 11, further comprising first opposing guide plates on the frame near the intake side of the engine in which opposing guides are defined for crosshead assemblies near the intake side of the engine and second opposing guide plates on the frame near the exhaust side of the engine in which opposing guides are defined for crosshead assemblies near the exhaust side of the engine.

13. The opposed piston engine of claim 11 wherein the frame comprises:

a base with the bearing supports;

a cylinder frame in which the row of cylinders is disposed;

the cylinder frame removeably attached to the base; and, splash shields cooperating with the base and the cylinder frame to prevent liquid being splashed from the base past the cylinder frame.

14. An opposed piston engine, comprising:

a frame;

a row of cylinders attached to the frame, each cylinder having intake and exhaust manifolds;

the intake manifolds being aligned near a first edge of the row of cylinders and the exhaust manifolds being aligned near a second edge of the row of cylinders opposite the first edge;

a pair of opposed pistons slidably disposed in each cylinder;

bearing supports in the frame, beneath the row of cylinders;

a pair of crankshafts received in the bearing supports;

the axes of rotation of the crankshafts lying in a plane that is spaced apart from and parallel to a plane in which longitudinal axes of the cylinders lie;

a plurality of first linkages, each coupling a respective piston near an intake manifold only to a first crankshaft; and a plurality of second linkages, each coupling a respective piston near an exhaust port only to a second crankshaft;

a crosshead assembly for each linkage, each crosshead assembly comprising:

spaced-apart guides;

a pin positioned between the guides;

spaced-apart bearings; and each bearing including a collar rotatably engaging the pin and an arc-shaped bearing piece extending from the periphery of the collar and engaging a surface of a first guide;

in which each linkage comprises:

a connecting rod having a first end with two spaced-apart collars that rotatably engage a pin between spaced-apart bearings and a second end rotatably engaging a throw of a crankshaft; the diameter of the connecting rod collars being greater than the diameter of the crosshead bearing collars; and, a piston rod with a first end affixed to a piston and a second end affixed to the pin between the spaced-apart collars of the connecting rod.

15. The opposed piston engine of claim 14, further comprising first opposing guide plates on the frame near the intake manifolds in which opposing guides are defined for crosshead assemblies near the intake manifolds and second opposing guide plates on the frame near the exhaust manifolds in which opposing guides are defined for crosshead assemblies near the exhaust manifolds.

* * * * *